M. V. TRACY.
ANIMAL FEEDING DEVICE.
APPLICATION FILED APR. 30, 1919.

1,332,083.

Patented Feb. 24, 1920.

Inventor,
Mearl V. Tracy, by
G. C. Kennedy,
Attorney.

UNITED STATES PATENT OFFICE.

MEARL V. TRACY, OF ROLFE, IOWA, ASSIGNOR OF ONE-HALF TO BERNICE KERN, OF RAPID CITY, SOUTH DAKOTA.

ANIMAL-FEEDING DEVICE.

1,332,083.  Specification of Letters Patent.  Patented Feb. 24, 1920.

Application filed April 30, 1919. Serial No. 293,638.

*To all whom it may concern:*

Be it known that I, MEARL V. TRACY, a citizen of the United States of America, and a resident of Rolfe, Pocahontas county, Iowa, have invented certain new and useful Improvements in Animal-Feeding Devices, of which the following is a specification.

My invention relates to improvements in animal feeding devices, and especially of the type which comprises a receptacle for feed in communication with a reservoir or source of supply therefor, and the objects of my improvements are, first, to provide an adjustable gate for variably controlling the dimensions of the communication between the receptacle and said reservoir; second, to so mount said gate as to render it vibratory under percussive action and by percussive means forming a part of this invention, that it will operate to dislodge and render free moving feed material near the gate and said communication, and third, to provide said receptacle with a detachably mounted bottom, whereby the receptacle may be easily and properly cleansed at any time.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
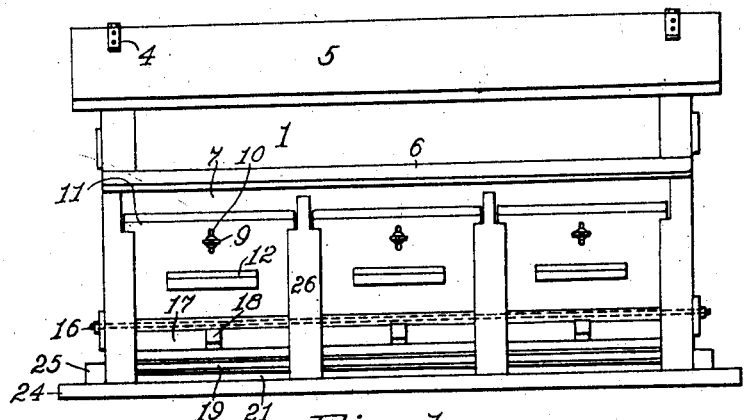
Figure 2:
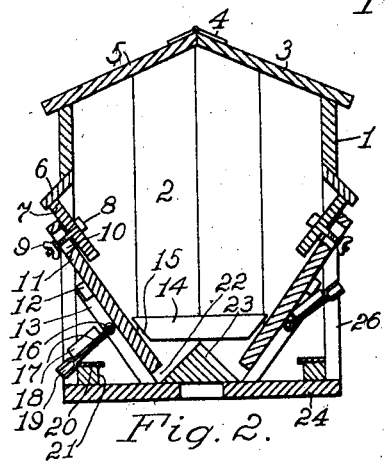
Figure 3:
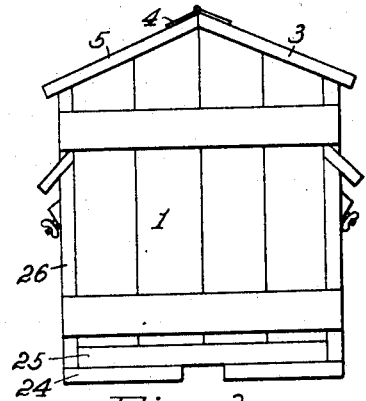
Figure 4:
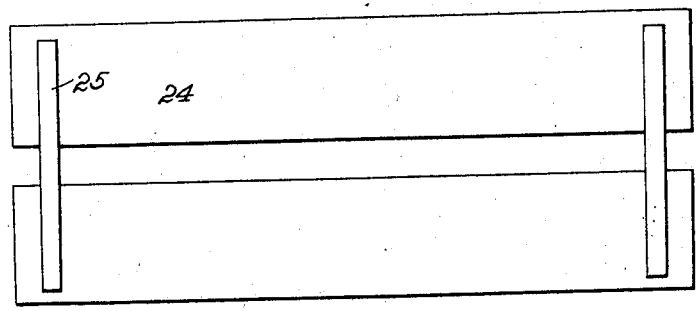

In the drawings, Figure 1 is a side elevation of my improved animal feeding device; Fig. 2 is a vertical transverse section thereof, and Fig. 3 is an end elevation thereof. Fig. 4 is a top plan of the removable base of the device.

Similar numerals of reference denote corresponding parts throughout the several views.

In my said device, 1 is a hollow structure or building of rectangular plan, having the oppositely sloping roof parts 3 and 5, of which the part 3 is fixed, and the part 5 adapted to swing upwardly on hinges 4, to permit the introduction of feed, but it is obvious that the roofing of said structure may be otherwise arranged. The interior space of the structure 1 may be sub-divided by a plurality of partitions 2, or not, as desired. When the partitions are made a part of the structure, the separated interspaces may be utilized to contain different kinds of feed.

Either one or opposite sides of the structure may contain openings near the bottom on one or opposite sides of a medial longitudinal angular or oppositely pitched beam 23 whose slopes serve to direct the grain or other feed to flow toward said openings.

Referring to Fig. 2, it will be seen that the structure, in its lower part, resembles a hopper in which the walls are principally formed from the downwardly converging gates 11 slidable in inclined seats between horizontal cross boards 14, sloping fixed bars 13 and fixed obliquely grooved standards 26. The interspaces 15 between the bars 13 and the beveled ends of the board 14 are wide enough to permit a little transverse play to the gates 11. Above and within the gates 11 are inclined side boards 7, extending downwardly from the outwardly inclined fixed side boards 6, the latter serving as rain deflectors for the joint between each gate and the supporting boards 7. Each gate 11 is adjustably and slidably connected to the board 7 above it by means of a bolt 8 passed through the board 7 and through a vertical slot 10 in the gate so that the gate may be secured in a vertically adjusted position to vary the dimensions of the opening 22 leading from the interior of a reservoir into the receptacle without said gate. This receptacle is constructed in the following manner:

The numeral 24 denotes a pair of spaced parallel boards arranged in the same plane horizontally, and connected by means of cross bars 25 fixed thereon near their ends. These boards form a base for the structure 1, from which the latter is removable, the ends of said structure fitting between the cross-bars 25.

The planks 24 are wide enough to underlie parts of the base of the longitudinal beam 23, below said gates, and extending as far as the outer side walls of the structure, thus rendering it suitable for the bottom of the receptacle. The numeral 21 denotes a longitudinal beam fixed in the lower part of the structure, one on each side, to contact with the planks 24, and serving as low outer walls for the receptacles. Upon the top of each beam 21 is fixed a metal plate 20 which projects into the receptacle a short distance, providing a ledge which prevents an animal from injuring the adjacent parts below it. The open top of each receptacle may be closed by means of a closure 17 hung swingingly on a fixed horizontal rod 16. Each closure may be made of a doubled-over metal plate having a tubular bearing for said rod, the middle parts of the plate being brought together, and then expanded toward their outer ends to receive a rigid filling body 19. The numeral 18 denotes a block fixed transversely across the middle of the upper part of said closure and adapted, when the closure is swung upwardly, to percussively contact with the horizontal block 12 fixed on the outer face of the gate 11, to jar and somewhat displace the gate transversely in its widened seat 15, to thereby loosen up the discharge of feed through the communication 22.

The gates 11 may be hung in a vertically adjusted position to permit proper discharge of the feed into the receptacle, or closed if desired. The closure 17 is lifted by the animal preliminary to obtaining feed from said receptacle, thereby causing the percussive action upon the gate mentioned when the block 18 strikes the block 12. The block 12 also serves for manually lifting the gate. The removable bottom, above described, permits the cleaning of the receptacles.

Having described my invention, what I claim as new, and desire to secure by Letters Patent, is:

1. In a device of the class described, an open top feeding trough, a hopper having a wall inclined over said trough with its lower edge spaced from the trough providing a delivery mouth for the hopper, an inclined impending gate movable under said inclined wall connected loosely thereto for vertical adjustment and limited transverse movements, an upwardly swinging closure for the open top of the trough hung below said impending gate, an elongated percussion-body mounted on the closure, and an elongated percussion-body mounted on the gate within the line of movement of the first-mentioned percussion-body and positioned angularly across it.

2. In a device of the class described, a feeding-trough made up of a vertically disposed outer wall, an inclined inner wall, a base-plate removably forming the bottom of the trough and having raised end parts abutting upon the outer ends of the trough, an impending hopper delivering into said trough over said inclined wall, and a vibratile gate supported movably for varying the delivery area of said hopper.

3. In a device of the class described, a feeding-trough made up of outer, inner and end walls, a base-plate removably forming the bottom of the trough, an impending hopper delivering into said trough, a vibratile gate supported movably for varying the delivery area of said hopper, and stops on the ends of said base-plate engaging said trough to prevent endwise displacements of the trough.

Signed at Waterloo, Iowa, this 14th day of April, 1919.

MEARL V. TRACY.